May 15, 1928.
R. P. MILLER
TIN TOP BASKET FRUIT PROTECTOR
Filed Sept. 14, 1927
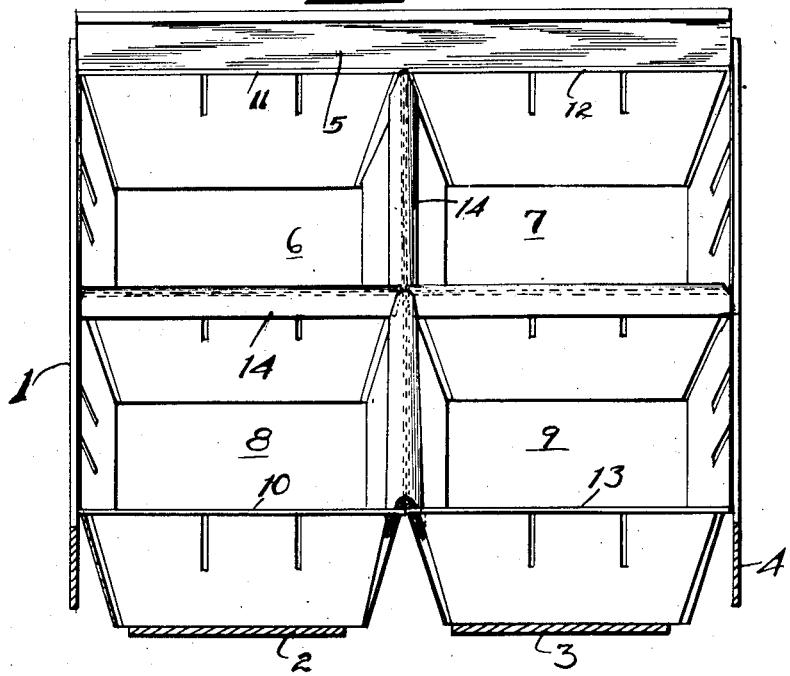
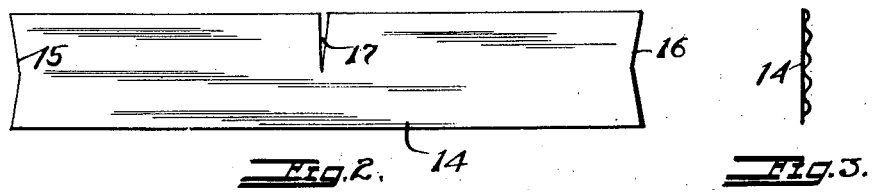
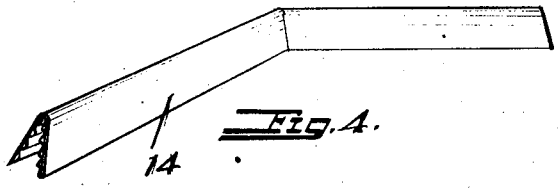
INVENTOR.
Robert P. Miller.
BY
Carlos P. Griffin
ATTORNEY.

Patented May 15, 1928.

1,669,669

UNITED STATES PATENT OFFICE.

ROBERT P. MILLER, OF SACRAMENTO, CALIFORNIA, ASSIGNOR TO SCHMIDT LITHOGRAPH COMPANY, OF SAN FRANCISCO, CALIFORNIA, A CORPORATION OF CALIFORNIA.

TIN-TOP-BASKET FRUIT PROTECTOR.

Application filed September 14, 1927. Serial No. 219,432.

This invention relates to a protecting device to be applied to tin top baskets to prevent the injury that ordinarily occurs to fruit when packed in tin top baskets and shipped considerable distances in refrigerator cars.

It will be understood by those skilled in the art that it is common to provide chip baskets with a tin top which is placed on the upper edges of the basket and holds the two parts together. Four of these baskets are usually placed in a crate, and when the baskets are filled with fruit the fruit is higher than the top of the crate, the object being to have the top when placed on the crate squeeze the fruit tightly enough to prevent it from loosening up when shipped for a number of days, the shrinkage of the fruit and continual jarring causing the package to become faulty unless the fruit is packed tightly therein when the crate is closed. The result of squeezing the fruit tightly in the crate is to cause more or less bruising of the fruit by the rigid edges of the basket which extend to the center of the crate, with the result that where the shipment of the crates require a number of days, as in shipping fruit from the Pacific coast to eastern markets that practically all of the fruit in contact with the upper edges of the basket becomes rusted from the metal on the top of the four baskets extending to the center of the crate thereby resulting in a considerable loss.

With the present invention corrugated strips are cut which are capable of holding themselves in place on the tops of the four baskets and as the material is quite springy these strips afford sufficient cushion to prevent serious injury to the fruit and also prevent it from getting rusted from contact with the tin tops of the baskets.

Other objects of the invention will be apparent as the description proceeds.

An embodiment of the invention is shown in the accompanying drawing in which the same reference numeral is applied to the same portion throughout the several figures of the drawings and of which there may be modifications.

Figure 1 is a perspective view of a crate with one end removed showing the four baskets in position therein, Figure 2 is a plan view of one of the strips used for covering the basket tops,

Figure 3 is an end view of the same strip, and

Figure 4 a perspective view of the same strip as it appears ready to be placed upon the basket.

The numerals 1, 2, 3 and 4 represent the sides and bottom of a crate, said sides and bottom being secured ordinarily at both ends to a heavier crate end as indicated at 5.

Both crate ends are slightly higher than the baskets in order that the baskets may be packed full and the fruit tightly compressed therein when the top is placed in position. The baskets are indicated at 6, 7, 8 and 9 and each basket is provided with a tin top extending entirely around the same as indicated at 10, 11, 12 and 13. The protecting strips consist of a flat sheet of corrugated paper or fiber board 14. This corrugated strip is twice as long as one of the sides of the basket, and it has a broad V-shaped cut 15 and 16 at each end, while there is a narrow cut 17 at its center which extends one-half the distance across the strip.

Before the fruit is packed and after the baskets have been put in the crate the packer picks up two of the strips 14 and bends them to the shape shown in Figure 4 whereupon they are pushed into position on the top of three baskets as indicated in Figure 1. That is one of them covers two sides of the top edges of one basket, and one side of the top edges of the two adjacent baskets with the ends of each strip extending through the slot at the corner of each basket to prevent it from being lifted out of position until the baskets are removed bodily and as the ends of the cuts 17 bear upon the adjacent strips when in position they too aid in preventing the accidental displacement of the protecting strip.

In practice the straps have considerable spring and when placed in position they give slightly when the pressure of closing the crate and nailing the top in place occurs so that the injury to the fruit is smaller than it would be otherwise while they at the same time prevent the fruit from coming in contact with the tin strip extending into the center of the crate on each of the boxes and thereby prevent rusting all the fruit that ordinarily is in contact with said tin tops.

Having thus described my invention what I desire to secure by Letters Patent of the United States is as follows but modifications may be made in carrying out the invention as shown in the drawing and in the above particularly described form thereof, within the purview of the annexed claims.

1. A fruit protector for baskets comprising a fiber strip having broad V-shaped cuts at opposite ends with a transverse cut near its center to permit the strip to be bent into an inverted U-shape to cover the two adjacent edges of three baskets the ends interlocking with the baskets to hold the strips in place.

2. In a fruit basket protector for crated fruit baskets comprising a strip of corrugated fiber board having its ends cut with a broad V and with a center cut extending approximately one-half the width of the strip whereby the strip may be folded to an inverted U-shape and bent at its center to cover the adjacent edges of three baskets in a crate, the ends interlocking with said baskets.

In testimony whereof I have hereunto set my hand this 31st day of August, A. D. 1927.

ROBT. P. MILLER.